UNITED STATES PATENT OFFICE.

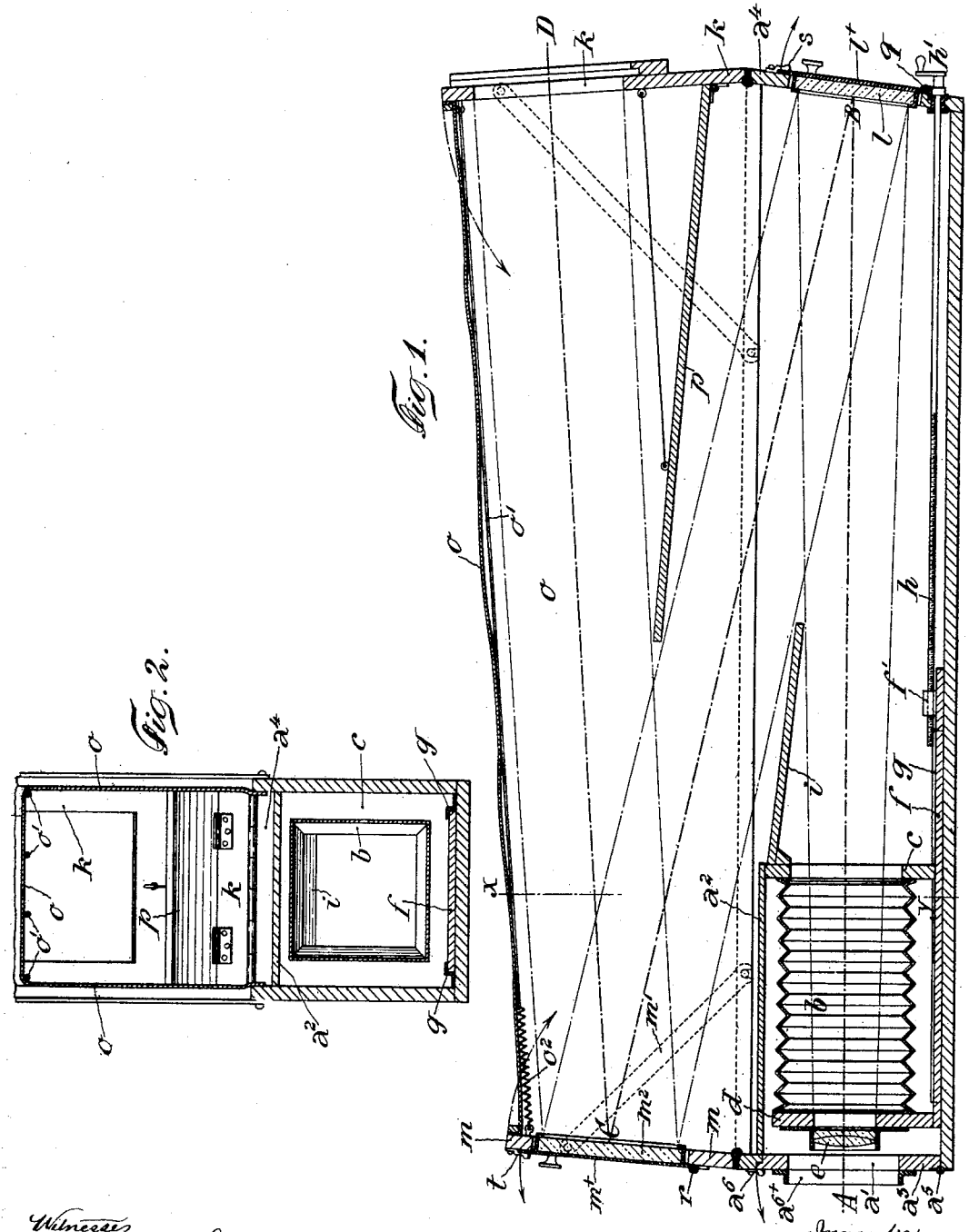

AUGUSTE VAUTIER, OF GRANDSON, SWITZERLAND.

PHOTOGRAPHIC CAMERA.

SPECIFICATION forming part of Letters Patent No. 703,858, dated July 1, 1902.

Application filed March 19, 1902. Serial No. 98,872. (No model.)

*To all whom it may concern:*

Be it known that I, AUGUSTE VAUTIER, captain, of Grandson, Switzerland, have invented certain new and useful Improvements in and Relating to Photographic Cameras, of which the following is a specification.

Heretofore photographic cameras with telescopic lenses have been employed for certain purposes—as, for instance, in photographing the moon or stars; but the said instruments, as known to the art, could not be used under all circumstances, and the construction of the same was such as to make them very costly and cumbersome.

The object of the present invention is to provide an improved photographic camera intended to be used in the production of telescopic photographs or of objects placed at a great distance from the apparatus.

The invention comprises a suitable combination of means for accomplishing the aforesaid purpose.

In the drawings, Figure 1 is a longitudinal section of my improved photographic camera; and Fig. 2 is a transverse section at the line $x\ y$, Fig. 1.

The apparatus is formed of a box $a$, in which is arranged an adjustable bellows or other telescoping box $b$, one end of which is fixed in the frame or partition $c$, secured to the box $a$, and the other end is fixed to a board or frame $d$, bearing a lens $e$, which is of great focal length. The board or frame $d$ is secured to a slide $f$ and arranged to be moved along in a suitable guideway $g$ and is provided with a stud $f$, which is engaged by a screw $h$, provided with a handle $h'$, placed outside the box. The lens $e$ may thus be advanced to or drawn from the opening $a'$, provided in the wall $a^3$ of the box $a$. A plate or cover $a^2$ closes the top of the portion of the said box $a$ and is situated between the wall $a^3$ of the same and the frame or partition $c$. The partition $c$ is further provided with a screen or plate $i$, intended to prevent the rays of light entering the lens $e$ from falling directly upon the sensible plate or film placed at $k$.

The wall $a^3$ of the box $a$ is hinged at $a^5$ and is retained in its closed position by means of a bolt $a^6$, thus allowing the said wall $a^3$ to be let down in the direction shown by an arrow, Fig. 1. The wall or frame $a^4$ of the box $a$, which is placed opposite the wall $a^3$, carries a mirror $l$, which is placed in an inclined position with regard to the axis of the lens $e$, and to the top of the wall $a^3$ of the box $a$ there is hinged a board or frame $m$, which latter is provided with suitable means—as, for instance, a bar $m'$, as shown by dotted lines in the drawings—for adjusting the frame in a predetermined position relatively to the mirror $l$, preferably exactly parallel to the same. The said board or frame $m$ carries a mirror $m^2$. The mirrors $l$ and $m^2$ are fixed in suitable frames or boxes $l^\times m^\times$, hinged, respectively, at $q$ and $r$ to the frames or walls $a^4$ and $m$, and are fixed in their positions by means of bolts $s$ and $t$. The said mirrors $l$ and $m^2$ may, therefore, be easily taken off and be put back again in their respective places, which is an important feature for the purpose of cleaning the same. The boxes or frames $l^\times m^\times$ may be temporarily provided with suitable metallic covers for inclosing the mirrors when the apparatus is not in use, which is quite necessary to prevent oxidation in said mirrors.

To the top of the board $a^4$ of the box $a$ there is hinged a board or frame $k$, intended to receive the plate or film holder. Said board $a^4$ is provided with suitable means for placing the same in a predetermined position with regard to the mirror $m^2$—as, for instance, the bar $m^3$. The relative positions of the mirrors $m^2$ and $l$ and the plate or film placed at $k$ should be so arranged that the axial ray of light A B, passing through the lens $e$, may be reflected by the mirror $l$, so as to strike the mirror $m^2$ directly in the center thereof and be reflected by the latter exactly in the center D of the plate or film placed at $k$. To the board or frame $a^4$ is hinged a screen $p$, intended to prevent the rays of light entering the lens from striking directly upon the plate or film at $k$.

To the top of the side walls of the box $a$ are secured the edges of a piece of suitable fabric or other flexible material $o$, adapted to inclose the whole apparatus except the opening $a'$ made in the wall $a^3$ of the box $a$ and the opening in the frame $k$, which flexible material renders the apparatus light-tight and is further secured to the board or frame $m$ and also to the frame $k$. The edges of the board or frame $m$ are connected with the edges of the frame $k$ by means of suitable springs $o'$, having at one or both of their ends a spring $o^2$, employed to cause the same to be normally straightened whenever the said boards or frames $m$ and $k$ are in their upright positions and to support the piece of fabric or other flexible material $o$, as shown in the drawings.

It will be readily understood that the apparatus, as hereinbefore described, is capable of being shut together to occupy a very small volume by simply turning down the board $m$ and the frame $k$ on their hinges. The mirror $m^2$ and the screen $p$ are then folded into the box $a$ until it is desired to use the apparatus again. The wall $a^3$ of the box $a$ may be provided with a shutter of any well-known construction.

The working of the apparatus is precisely similar to that of the ordinary photographic camera. A screen of rough glass is first placed into the frame $k$ and the shutter fixed in the opening $a'$ of the wall $a^3$. Then the handle $h'$ is rotated until the optical image appears in focus upon the said screen of rough glass at $k$. Next the shutter is closed, and the screen of rough glass is replaced by a photographic plate or film, and the shutter is reopened during the necessary time for exposure.

I claim as my invention—

1. In a photographic apparatus, the combination with a lens, a bellows, a box and means for adjusting the position of said lens, of a mirror set in the said box at an inclination to the axis of said lens, a mirror set parallel to the aforesaid mirror, and means secured in said frame for holding a photographic film, substantially as specified.

2. In a photographic apparatus, the combination with a lens, a bellows, a box and means for adjusting the position of said lens, of a mirror set in the said box at an inclination to the axis of said lens, a mirror set parallel to the aforesaid mirror, means secured in said frame for holding a photographic film, and means for preventing the light passing through the lens from directly striking the said photographic film, substantially as set forth.

3. In a photographic apparatus, the combination with a lens, a bellows, a box and means for adjusting the position of said lens, of a mirror set in the said box at an inclination to the axis of said lens, a mirror set parallel to the aforesaid mirror, means for adjusting the relative positions of said mirrors, means secured in said frame for holding a photographic film, and means for preventing the light passing through the lens from directly striking the said photographic film, substantially as specified.

4. In a photographic apparatus, the combination with a box $a$, bellows $b$, lens $e$ and means for adjusting the position of said lens, of a mirror $l$ set in said box at an inclination to the axis of the lens $e$, a frame $m$ hinged to the box $a$, a mirror $m^2$ in said frame $m$, means for adjusting the positions of said mirrors $l$ and $m^2$ so that they are parallel to each other, a frame $k$ hinged to said box $a$, means in said frame $k$ for holding a photographic film, screens $i$ and $p$ to prevent the rays of light passing through the lens from falling directly on the photographic film, and a flexible covering for the top of the instrument, the said frames and screens being adapted to fold in against the box when the instrument is not in use, substantially as specified.

In testimony that I claim the foregoing as my invention I have signed my name in presence of two subscribing witnesses.

AUGUSTE VAUTIER.

Witnesses:
E. IMER-SCHNEIDER,
L. H. MUNIER.